(12) United States Patent
Kakishima et al.

(10) Patent No.: US 10,596,941 B2
(45) Date of Patent: Mar. 24, 2020

(54) HEADREST

(71) Applicants: Tachi-s Engineering USA, Inc., Farmington Hills, MI (US); Bose Corporation, Framingham, MA (US)

(72) Inventors: Yasuo Kakishima, Farmington Hills, MI (US); Ravi Krishnan, Farmington Hills, MI (US); Dave Hamel, Farmington Hills, MI (US); Barry McLean, Framingham, MA (US); Seiji Kawakami, Framingham, MA (US)

(73) Assignees: TACHI-S ENGINEERING U.S.A. INC., Farmington Hills, MI (US); BOSE CORPORATION, Framingham, MA (US)

( * ) Notice: Subject to any disclaimer, the term of this patent is extended or adjusted under 35 U.S.C. 154(b) by 15 days.

(21) Appl. No.: 15/847,133

(22) Filed: Dec. 19, 2017

(65) Prior Publication Data

US 2019/0184881 A1 Jun. 20, 2019

(51) Int. Cl.
*B60N 2/879* (2018.01)
*B29C 44/42* (2006.01)
(Continued)

(52) U.S. Cl.
CPC ............. *B60N 2/879* (2018.02); *B29C 44/12* (2013.01); *B29C 44/42* (2013.01); *B60N 2/6045* (2013.01);
(Continued)

(58) Field of Classification Search
CPC ......... B60N 2/879; B29C 44/12; B29C 44/42; B29L 2031/3023
See application file for complete search history.

(56) References Cited

U.S. PATENT DOCUMENTS 3,385,393 A * 5/1968 Gold ...................... H04R 5/023
181/141
4,027,112 A * 5/1977 Heppner .................. A47C 7/38
381/182
(Continued)

FOREIGN PATENT DOCUMENTS

JP 2003-111640 A 4/2003
JP 2008-188099 A 8/2008
(Continued)

OTHER PUBLICATIONS

Extended European Search Report in counterpart EP Appln. No. 18208443.4—1010 dated Jun. 11, 2019.
(Continued)

*Primary Examiner* — Philip F Gabler
(74) *Attorney, Agent, or Firm* — Fitch, Even, Tabin & Flannery, LLP

(57) ABSTRACT

A headrest includes: (a) a headrest frame, (b) a speaker unit supported by the headrest frame and having a speaker box, a speaker attached to the speaker box, and a megaphone-shaped tube attached to the speaker box, (c) a cushion material, (d) a skin material having an opening, sewed into a pouch shape, and covering the headrest frame, the speaker unit, and the cushion material, and (e) a ring-shaped member securing the entire opening-side end portion of the skin material sandwiched between the ring-shaped member and the megaphone-shaped tube.

19 Claims, 13 Drawing Sheets

(51) Int. Cl.
*B29C 44/12* (2006.01)
*H04R 5/02* (2006.01)
*B60R 11/02* (2006.01)
*B60N 2/60* (2006.01)
*B60N 2/897* (2018.01)
*B29L 31/30* (2006.01)
*H04R 1/34* (2006.01)
*B60R 11/00* (2006.01)

(52) U.S. Cl.
CPC .......... *B60N 2/897* (2018.02); *B60R 11/0217* (2013.01); *H04R 5/023* (2013.01); *B29L 2031/3023* (2013.01); *B60R 2011/0017* (2013.01); *H04R 1/345* (2013.01); *H04R 2499/13* (2013.01)

(56) References Cited

U.S. PATENT DOCUMENTS

| | | | | |
|---|---|---|---|---|
| 5,133,017 | A * | 7/1992 | Cain | G01R 33/3854 381/71.6 |
| 6,975,737 | B2 * | 12/2005 | Hirao | H04R 5/023 381/302 |
| 9,403,454 | B2 * | 8/2016 | Subat | B60R 11/0217 |
| 9,428,090 | B2 | 8/2016 | Subat | |
| 9,682,641 | B1 * | 6/2017 | Subat | H04R 1/023 |
| 2003/0081795 | A1 | 5/2003 | Hirao | |
| 2015/0201260 | A1 | 7/2015 | Oswald et al. | |
| 2015/0298371 | A1 | 10/2015 | Tabata | |
| 2016/0137106 | A1 | 1/2016 | Subat et al. | |
| 2017/0106775 | A1 | 4/2017 | Takada et al. | |
| 2018/0029876 | A1 | 2/2018 | Fujita et al. | |
| 2018/0035185 | A1 * | 2/2018 | Fujita | B60N 2/80 |
| 2018/0072204 | A1 * | 3/2018 | Fritsch | B60R 11/0217 |
| 2018/0297499 | A1 * | 10/2018 | Bieven | B60N 2/5841 |
| 2019/0111820 | A1 * | 4/2019 | Subat | B60N 2/01 |

FOREIGN PATENT DOCUMENTS

| | | |
|---|---|---|
| JP | 2016-11004 A | 1/2016 |
| JP | 2017-535203 A | 11/2017 |
| WO | 2016/117687 A1 | 7/2016 |
| WO | 2016/129663 A | 8/2016 |
| WO | 2016/129663 A1 | 8/2016 |
| WO | 2016/151022 A1 | 9/2016 |
| WO | 2017/160572 A1 | 9/2017 |

OTHER PUBLICATIONS

Notice of Reasons for Refusal of JP Appln. No. 2018-213419 dated Sep. 3, 2019.

* cited by examiner

FIG.8
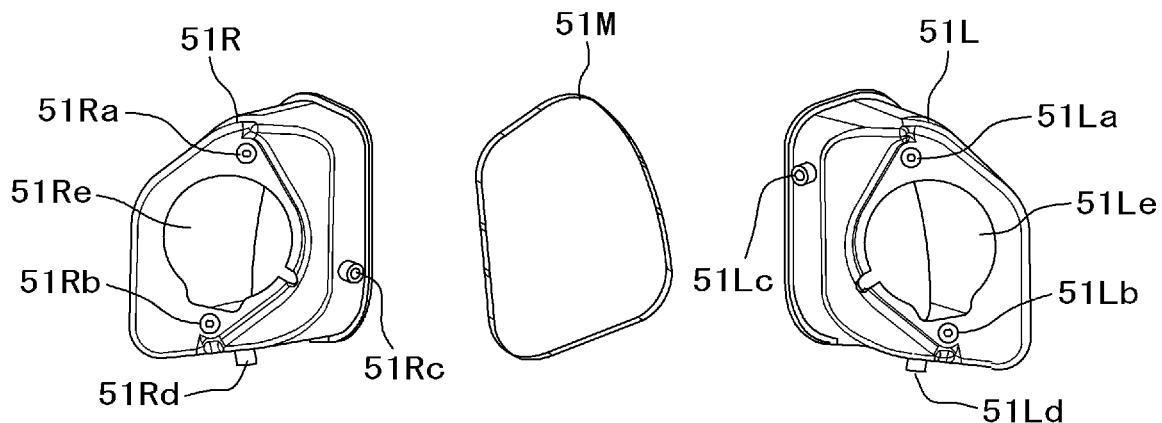
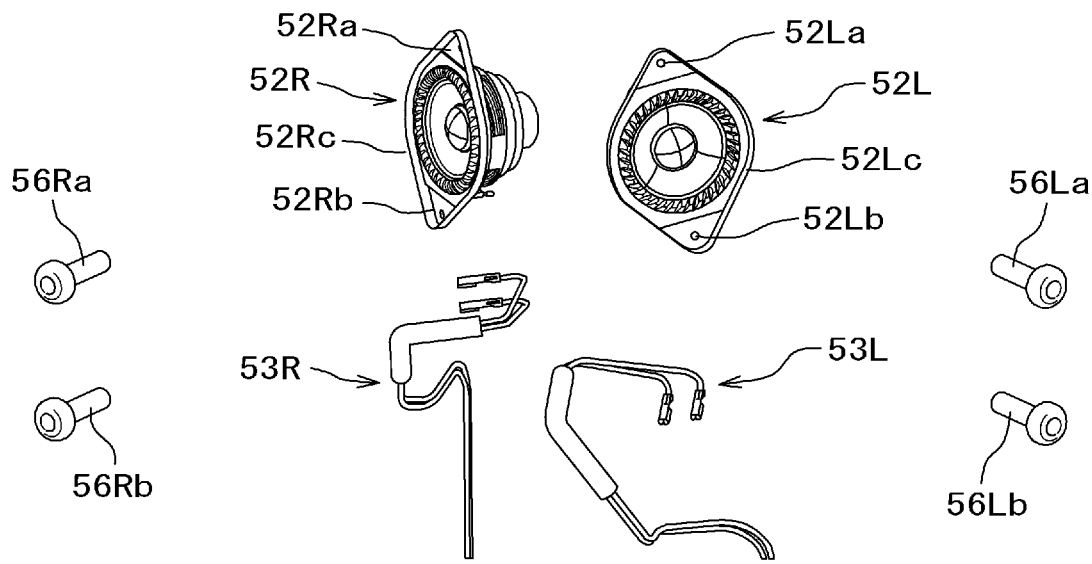
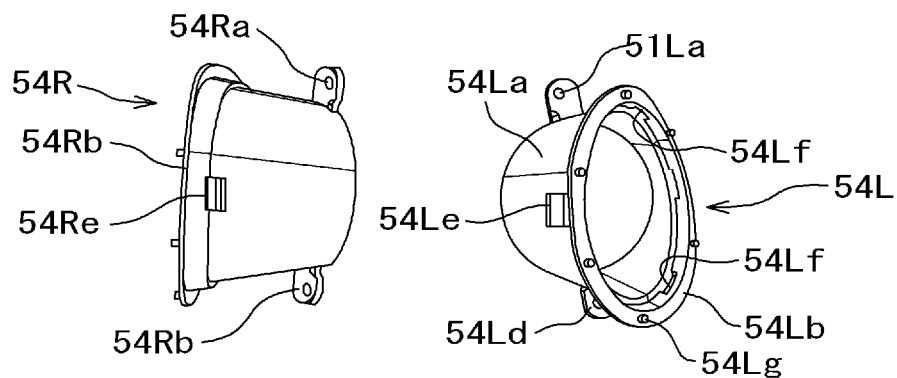

HEADREST

BACKGROUND

The present disclosure relates to headrests and is applicable to a headrest with a speaker, for example.

Headrests, armrests, and the like of vehicular seats are manufactured by skin integral foam molding. The skin integral foam molding refers to a manufacturing technique using a single step as a combination of two steps, foaming and covering. At this single step, a sewed trim cover (skin material) and a frame component are set in a mold and a foaming material such as a material of urethane is injected directly into the mold and foamed to implement molding (Refer to US 2015/0298371 (Patent Document 1), for example).

An example of a headrest with a speaker manufactured by skin integral foam molding is disclosed in WO 2016/129663 (Patent Document 2), for example.

SUMMARY

However, the technology in Patent Document 2 involves a problem. Though a skin material is provided with an opening portion to give off a sound from the speaker, an end portion of the opening portion in the skin material is not secured. Consequently, there is a possibility that a foaming material leaks out into a hole in a side support member during skin integral foam molding.

It is an object of the present disclosure to provide a headrest with a speaker and a vehicular seat in which skin integral foam molding can be implemented with higher sealability.

Other objects and novel features will be apparent from the description of the present disclosure and the accompanying drawings.

Following is a brief description of an overview of representative elements of the present disclosure:

A headrest includes: (a) headrest frame; (b) a speaker unit supported on the headrest frame and having a speaker box, a speaker attached to the speaker box, and a megaphone-shaped tube attached to the speaker box; (c) a cushion material; (d) a skin material sewed into a pouch shape having an opening and covering the headrest frame, the speaker unit, and the cushion material; and (e) a ring-shaped member securing the entire opening-side end portion of the skin material by sandwiching the end portion between the ring-shaped member and the megaphone-shaped tube.

BRIEF DESCRIPTION OF THE DRAWINGS

FIG. 8 is an exploded perspective view illustrating the speaker unit in FIG. 7;

DESCRIPTION OF THE PREFERRED EMBODIMENTS

Figure 1:
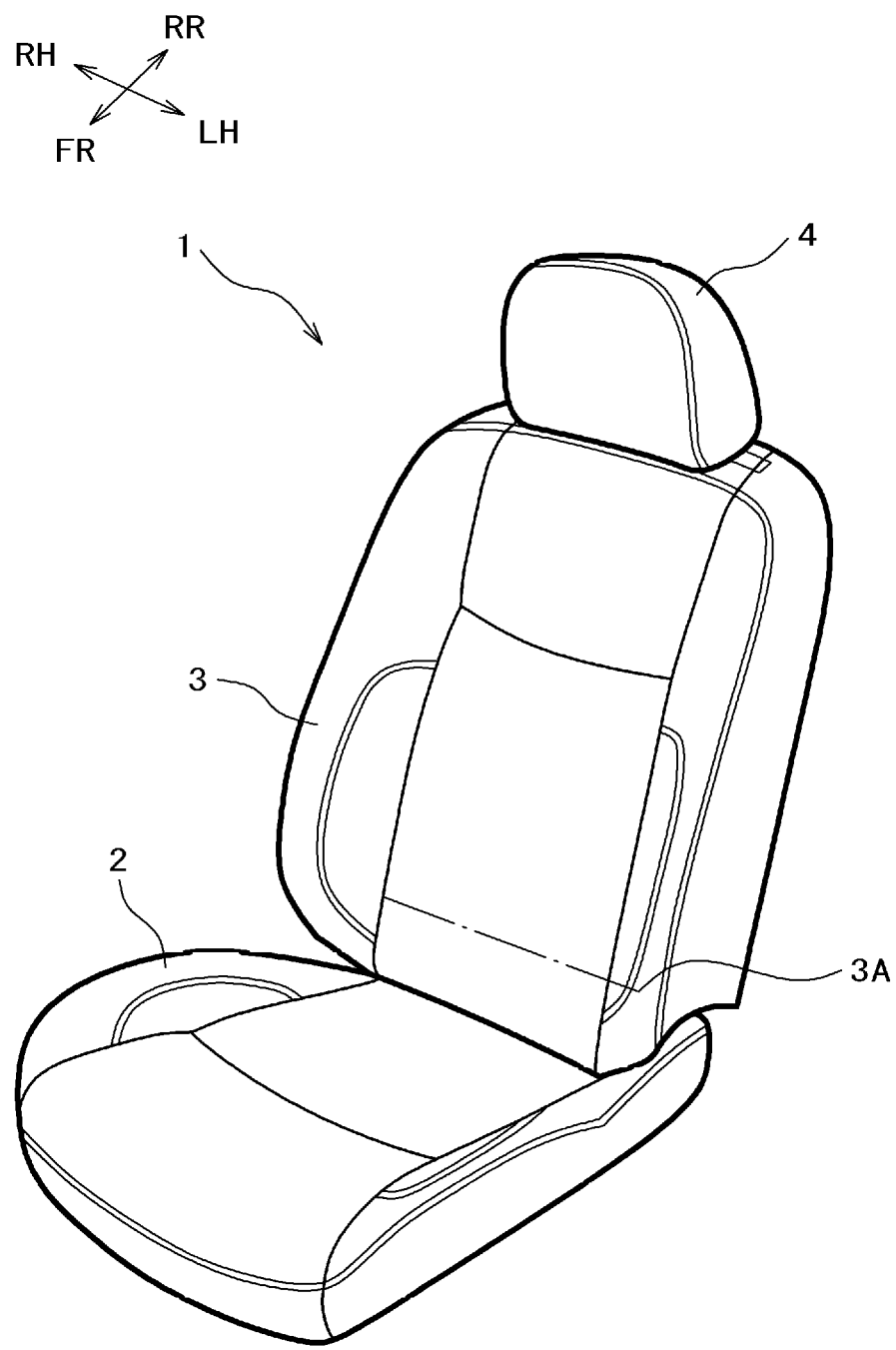
FIG. 1 is a perspective view of a vehicular seat in accordance with an embodiment.

Hereafter, a description will be given to an embodiment of the present disclosure with reference to the drawings. In the following description, identical components will be marked with identical reference numerals and a repetitive description of such components may be omitted. In the drawings, the width, thickness, shape, and the like of each part may be schematically depicted as compared with actual appearance for the purpose of making the description clearer. Such depictions are just an example and are not intended to limit the interpretation of the present invention.

Figure 2:
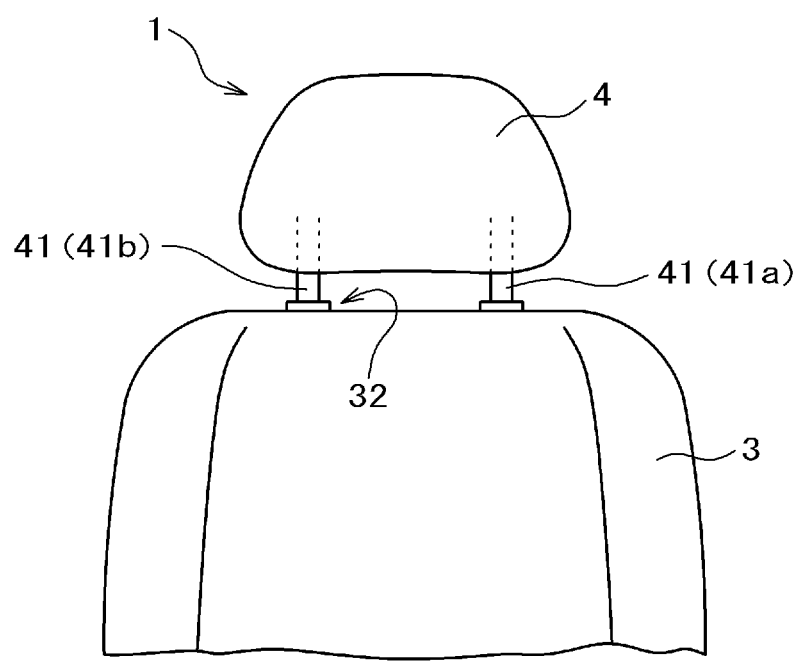
FIG. 2 a schematic partial front view illustrating a way the headrest in FIG. 1 is mounted.

FIG. 1 is a perspective view of a vehicular seat in accordance with an embodiment. FIG. 2 is a schematic partial front view of a seat back provided with the headrest in FIG. 1, illustrating how to mount the headrest. In the following description, a perpendicular direction is defined as upward and downward directions on the basis of a vehicle mounted with the vehicular seat 1 placed on a horizontal plane. Front and rearward directions (FR, RR) are defined as directions consistent with the frontward and rearward directions of the vehicle; and leftward and rightward directions (width direction) are defined as directions consistent with the width direction of the vehicle. FR denotes the frontward direction of the vehicle and RR denotes the rearward direction of the vehicle. In the following description, the right side (RH) and the left side (LH) of the vehicular seat 1 are designated as viewed in the traveling direction of the vehicle.

As illustrated in FIG. 1, the vehicular seat 1 includes: a seat cushion 2 on which a person seats him/herself; a seat back 3 erected at the rear end of the seat cushion 2; and a headrest 4 provided at the upper end of the seat back 3.

The seat cushion 2 is installed on the floor of the vehicle but can be provided with a mechanism for making a frontward/rearward position or a height adjustable.

The seat back 3 constitutes a backrest and is coupled with the seat cushion 2 such that the seat back is rotatable about a rotation axis (rotation center line, rotation axial center) 3A provided at the lower end of the seat back. That is, the vehicular seat is provided with a reclining function for tiling the seat back 3 rearward and a frontward tilting function for inclining the seat back 3 frontward and the seat back 3 is configured such that the seat back is rotatable relative to the seat cushion 2. In FIG. 1, the rotation axis 3A covered with a cushion material and a trim cover is indicated by alternate long and short dashed lines.

The headrest 4 is attached to the seat back 3 such that the height position of the headrest is adjustable.

The seat cushion 2, the seat back 3, and the headrest 4 are provided therein with a frame to be a skeleton member and a cushion material formed of resin foam and the like and the surface of the cushion material is covered with a trim cover (skin material).

As illustrated in FIG. 2, the headrest 4 includes a headrest stay 41 having a pair of right and left portions (longitudinal frame portions 41a, 41b described later) extending downward. The headrest is attached to the seat back 3 by inserting the headrest stay 41 into headrest holders 32 at the upper part of the seat back 3.

Figure 3:
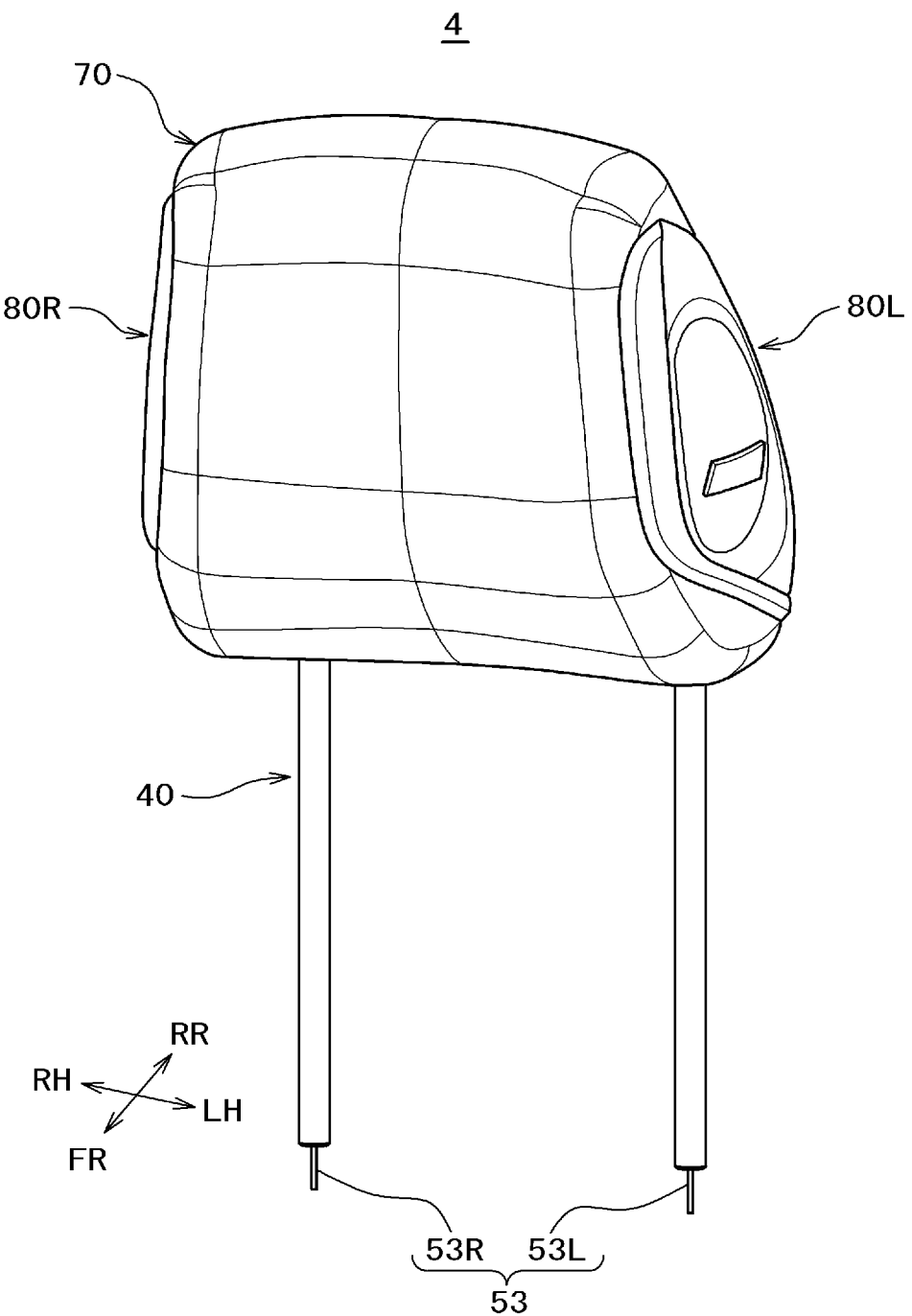
FIG. 3 a perspective view illustrating an appearance of the headrest in FIG. 1.
Figure 4:
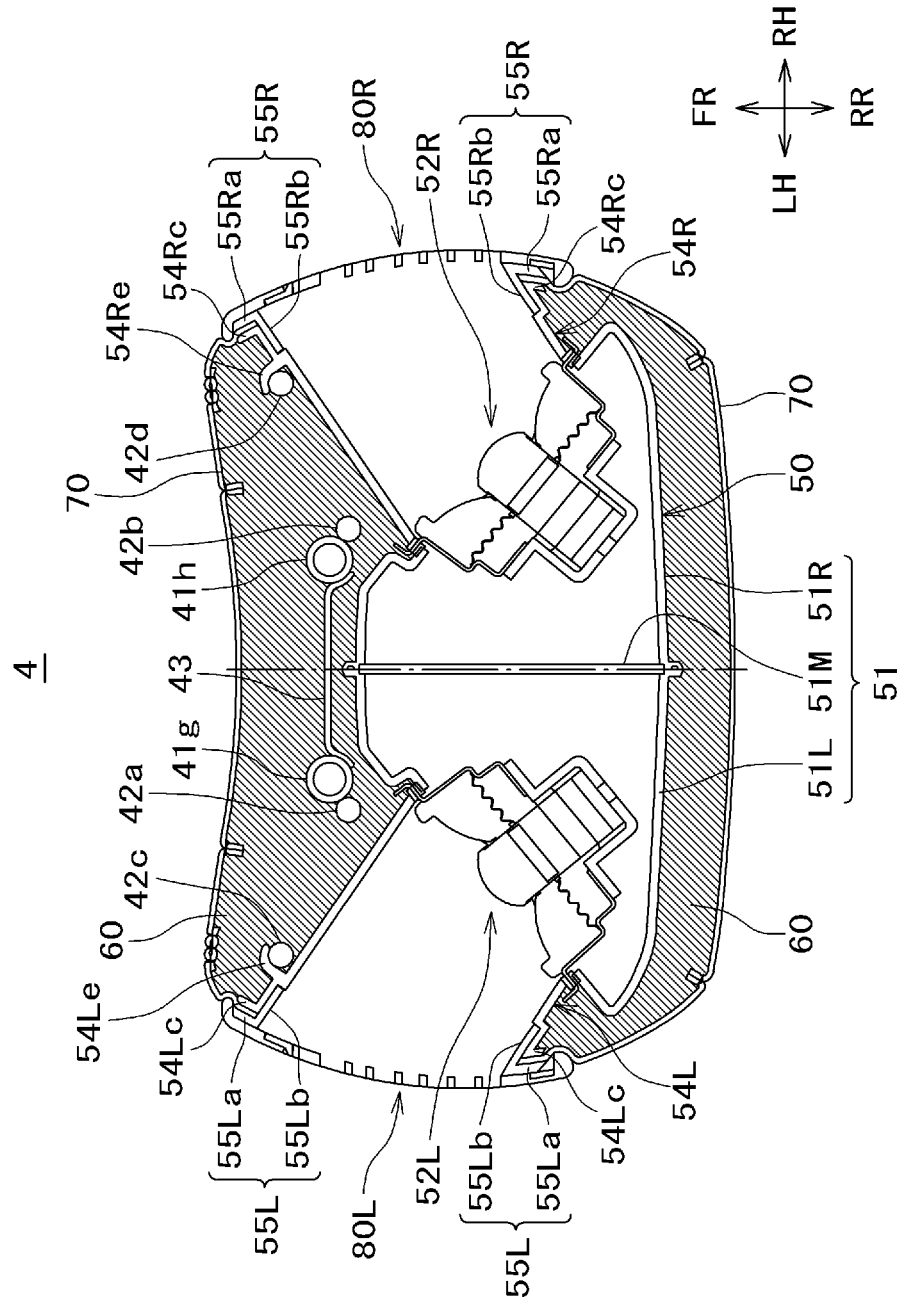
FIG. 4 is a sectional view illustrating an internal structure of the headrest in FIG. 3.

A detailed description will be given to a structure of the headrest 4 with reference to FIGS. 3 and 4. FIG. 3 is a perspective view illustrating an appearance of the headrest in FIG. 1. FIG. 4 is a sectional view illustrating an internal structure of the headrest in FIG. 3.

The headrest 4 includes: the headrest frame 40; a speaker unit 50 attached to the headrest frame 40; the cushion material 60; a pouch-like skin material 70; and speaker grill units 80R, 80L. The cushion material 60 is provided by subjecting a foaming body formed of urethane or the like to skin integral foam molding. Speaker wirings 53 (speaker wirings 53R, 53L) are connected with wirings coming from the vehicle body side, routed inside the seat back 3.

Figure 5:
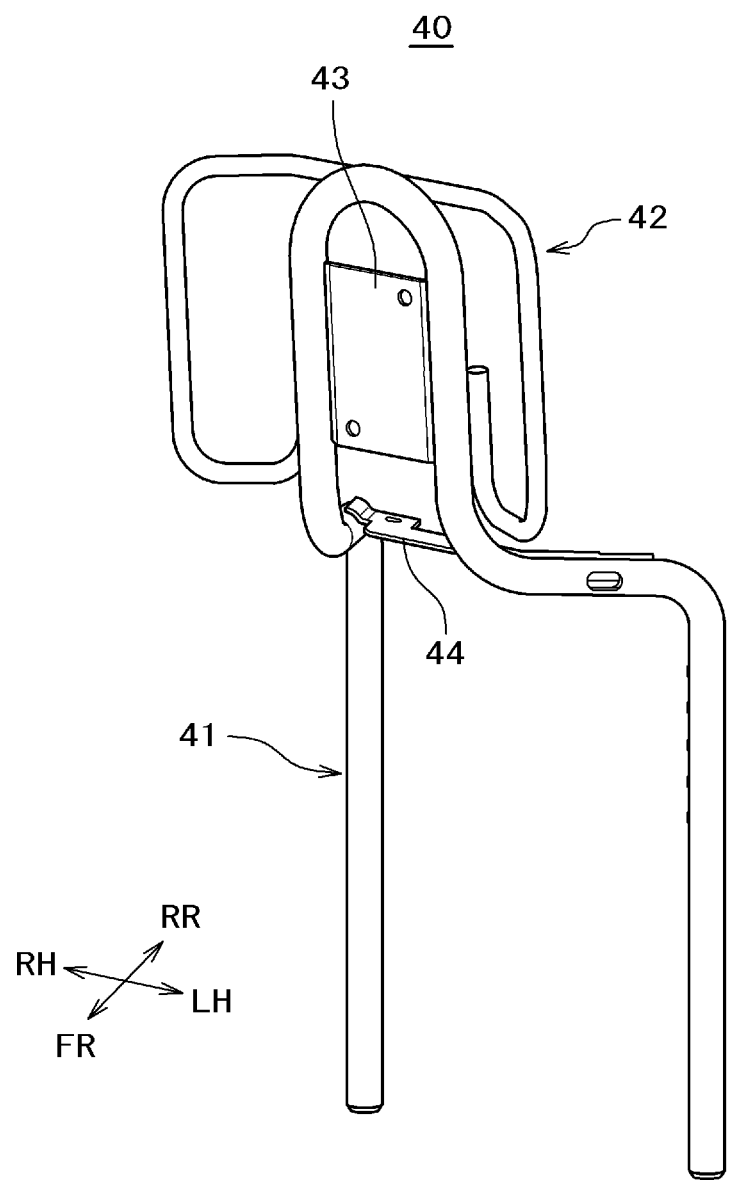
FIG. 5 is a perspective view illustrating the headrest frame in FIG. 4.
Figure 6:
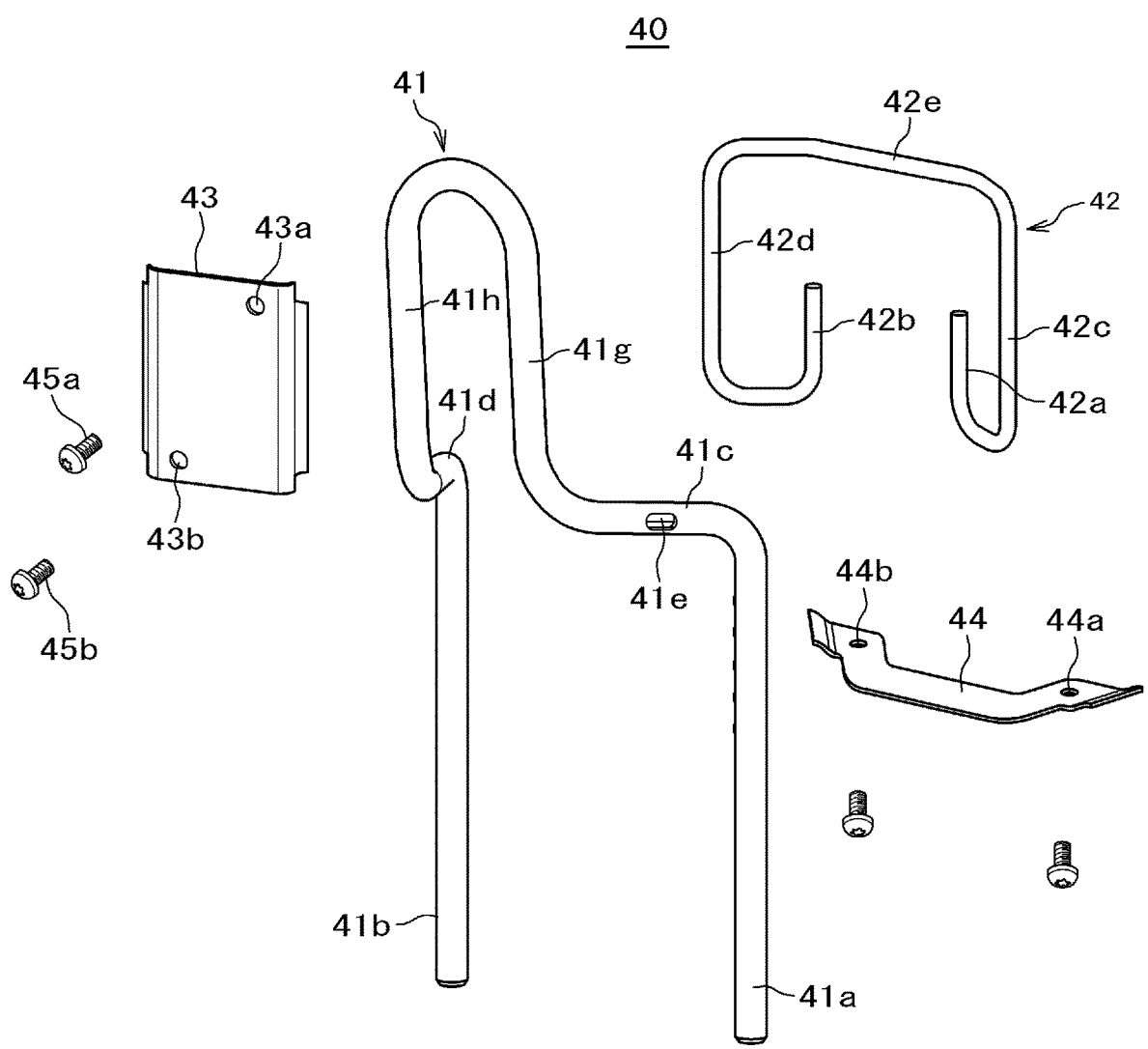
FIG. 6 is an exploded perspective view illustrating the headrest frame in FIG. 5.

A description will be given to a structure of the headrest frame 40 with reference to FIGS. 5 and 6. FIG. 5 is a perspective view illustrating the headrest frame in FIG. 2. FIG. 6 is an exploded perspective view illustrating the headrest frame in FIG. 5.

The headrest frame 40 includes: the headrest stay 41; a headrest support wire 42; a headrest bracket 43 as a first bracket; and a headrest bracket 44 as a second bracket.

The headrest stay 41 is formed by bending a metal pipe and includes: a pair of right and left longitudinal frame portions 41a, 41b extending substantially in the perpendicular direction; a pair of right and left horizontal frame portions 41c, 41d respectively extending from the longitudinal frame portions 41a, 41b substantially in the horizontal direction; and a pair of right and left longitudinal frame portions 41g, 41h extending from the horizontal frame portions 41c, 41d substantially in the perpendicular direction with their respective upper parts connected with each other. As mentioned above, the longitudinal frame portions 41a, 41b are respectively inserted into a pair of the headrest holders 32 supported by a back frame of the seat back 3 at a predetermined distance from each other in the horizontal direction. The horizontal frame portion 41c has a hole 41e for inserting a speaker wiring 53L. The horizontal frame portion 41d also has a hole (not shown) for inserting a speaker wiring 53R.

The headrest support wire 42 is formed by bending a metal wire and includes: a pair of right and left inner longitudinal wire portions 42a, 42b extending substantially in the perpendicular direction; and a pair of right and left outer longitudinal wire portions 42c, 42d whose respective lower parts are connected with the respective lower parts of the longitudinal wire portions 42a, 42b. The outer longitudinal wire portions are extended substantially in the perpendicular direction and their respective upper parts are connected with each other. The inner longitudinal wire portions 42a, 42b are secured on the longitudinal frame portions 41g, 41h of the headrest stay 41; and the outer longitudinal wire portions 42c, 42d are engaged with protruded portions 54Re, 54Le of megaphone-shaped tubes 54R, 54L described later.

The headrest bracket 43, which is for fixing the front face of the speaker unit 50 (speaker box 51), has holes 43a, 43b for letting through screws 45a, 45b as fastening materials and is secured on the longitudinal frame portions 41g, 41h.

The headrest bracket 44, which is for fixing the bottom face of the speaker unit 50 (speaker box 51), has holes 44a, 44b for letting through screws 46a, 46b and is secured on the horizontal frame portions 41c, 41d.

Figure 7:
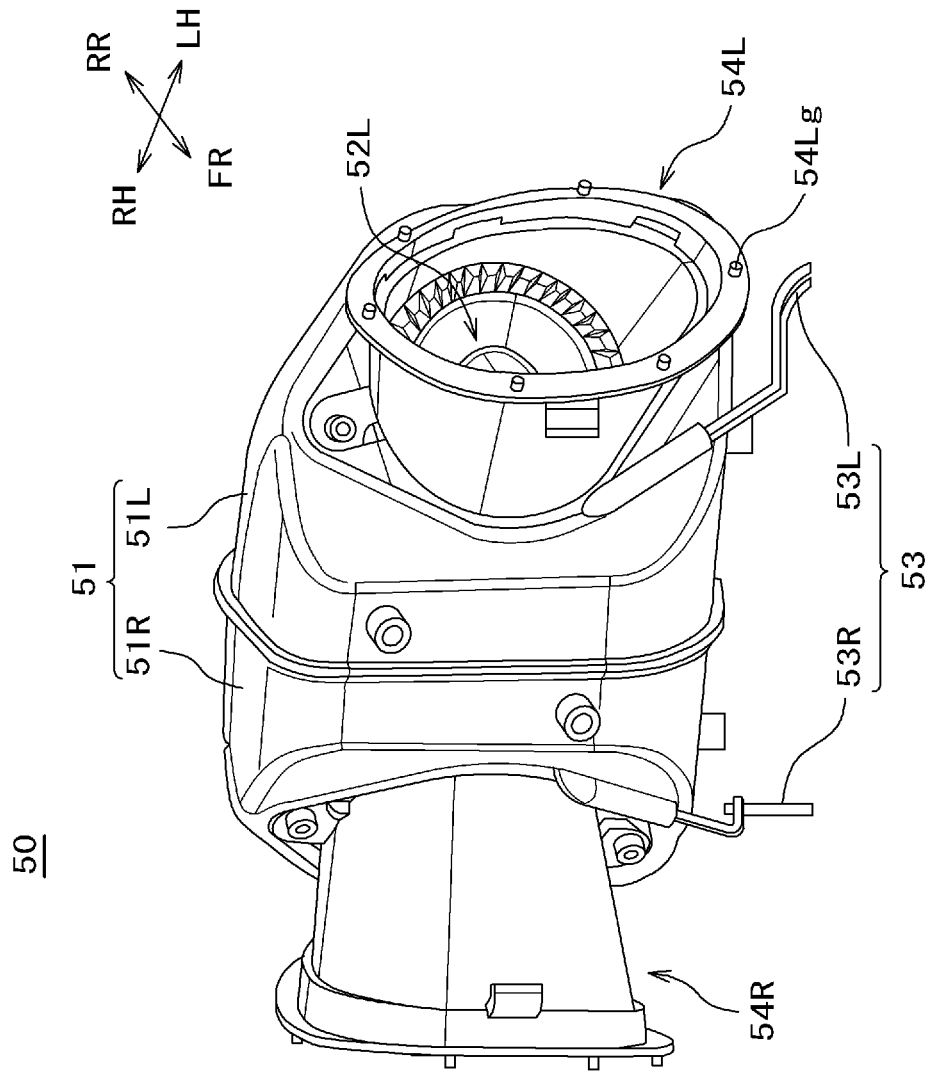
FIG. 7 is a perspective view illustrating the speaker unit in FIG. 4.
Figure 9:
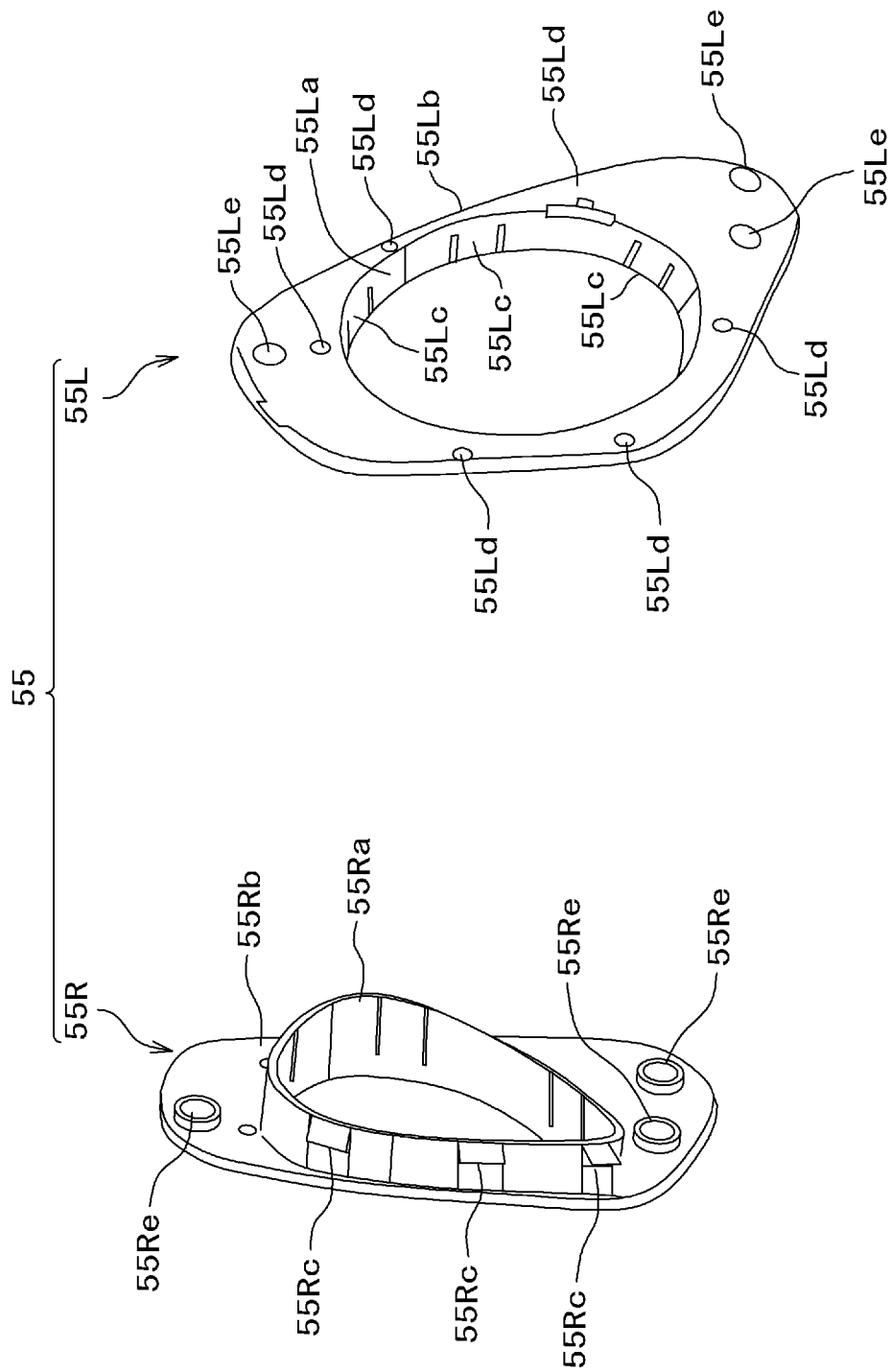
FIG. 9 is a perspective view illustrating the cover portions in FIG. 4.

A description will be given to a structure of the speaker unit 50 with reference to FIGS. 3 and 7 to 9. FIG. 7 is a perspective view illustrating the speaker unit in FIG. 4. FIG. 8 is an exploded perspective view illustrating the speaker unit in the FIG. 7. FIG. 9 is a perspective view illustrating the cover portions in FIG. 4.

As illustrated in FIGS. 7 and 8, the speaker unit 50 includes: the speaker box 51; speakers 52R, 52L; the speaker wirings 53R, 53L; and megaphone-shaped tubes 54R, 54L. Such cover portions 55R, 55L as ring-shaped members as shown in FIG. 9 are attached to the speaker unit 50.

The speaker box (enclosure) 51 includes: a right speaker box 51R in which the speaker 52R is placed; a left speaker box 51L in which the speaker 52L is placed; and a plate-like member 51M inserted into between the speaker box 51R and the speaker box 51L. The speaker box is partitioned (separated) into the right and left speaker boxes 51R, 51L by the 51M. Because of this configuration, right and left separated spaces are formed behind the speakers 52R, 52L in the speaker box 51. These spaces function as acoustic chambers important for sound effect and this enables enhancement of the sound quality of the headrest with the built-in speakers.

Hereafter, a description will be given to the left side of the speaker unit 50 but the right side is substantially symmetrical with the left side and a description of the right side is identical with that of the left side. The reference numerals of elements on the left side are suffixed with L and the reference numerals of corresponding elements on the right side are suffixed with R.

The speaker box 51L is made of synthetic resin such as polypropylene and includes: a screw hole 51Lc for securing on the bracket 43 with the screw 45a; a screw hole 51Ld for securing on the bracket 44 with the screw 46a; screw holes 51La, 51Lb for securing the speaker 52L and the megaphone-shaped tube 54L with screws 56La, 56Lb; and a substantially round opening portion 51Le in which the speaker 52L is placed. The speaker box 51R is symmetrical with the speaker box 51L except a screw hole 51Rc.

The speaker 52L includes: mounting portions 52La, 52Lb having holes for inserting the screws 56La, 56Lb into the speaker box 51L; and a flange portion 52Lc positioned outside the opening portion 51Le.

The megaphone-shaped tube 54L made of synthetic resin such as polypropylene is for radiating a sound from the speaker 52L to a lateral side of the headrest 4 and includes a tubular portion 54La and a flange portion 54Lb. The tubular portion 54La has, in its outer wall, mounting portions 54Lc, 54Ld having holes for inserting the screw 56La, 56Lb into the speaker box 51L and a protruded portion 54Le to be engaged with the headrest support wire 42; and in its inner wall a recess 54Lf for installing the cover portion 55L. The base portion of the tubular portion 54La is so sized that the base portion can be abutted against the flange portion 52Lc of the speaker 52L. The flange portion 54Lb includes a protruded portion 54Lg. The tubular portion 55La of the cover portion 55L is inserted into an area between the tip portion and the protruded portion 54Le; however, the area close to the tip portion is offset outward (the inside diameter of the tubular portion 54La is increased) by an amount equivalent to the thickness of the tubular portion 55La. The cover portion 55L-side opening of the megaphone-shaped tube 54L is larger than the speaker 52L-side opening. The speaker 52L-side opening of the megaphone-shaped tube 54L is equal to the opening of the speaker box 51L is size.

As illustrated in FIG. 9, the cover portion 55L is made of synthetic resin such as polypropylene and includes: the tubular portion 55La inserted into the opening of the megaphone-shaped tube 54L; and a flange portion 55Lb for fixing the skin material 70. The tubular portion 55La includes six lugs 55Lc to be inserted into the recesses 54Lf of the megaphone-shaped tube 54L to fit the cover portion 55L. The flange portion 55Lb includes: six holes 55Ld into which the protruded portion 54Lg of the flange portion 54Lb of the megaphone-shaped tube 54L is inserted; and three holes 55Le for fixing a speaker grill unit 80.

Figure 10:
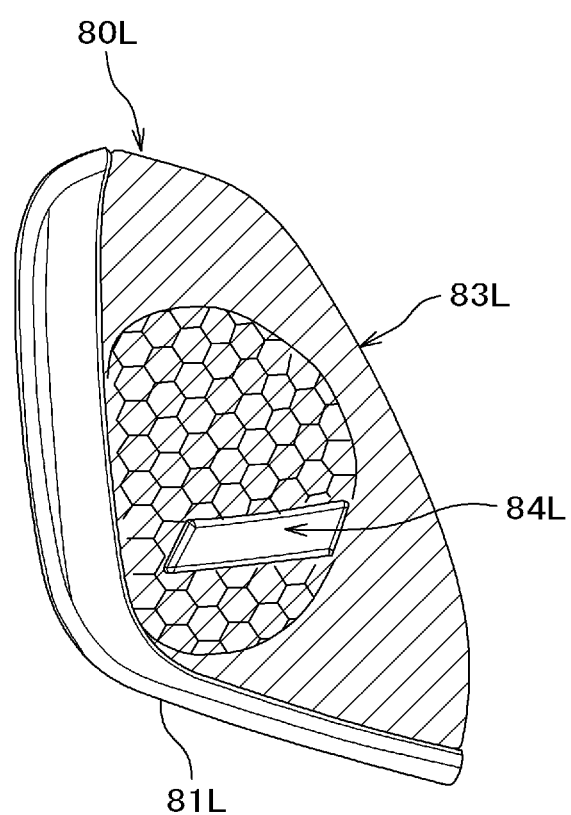
FIG. 10 is a perspective view illustrating a speaker grill in FIG. 3.
Figure 11:
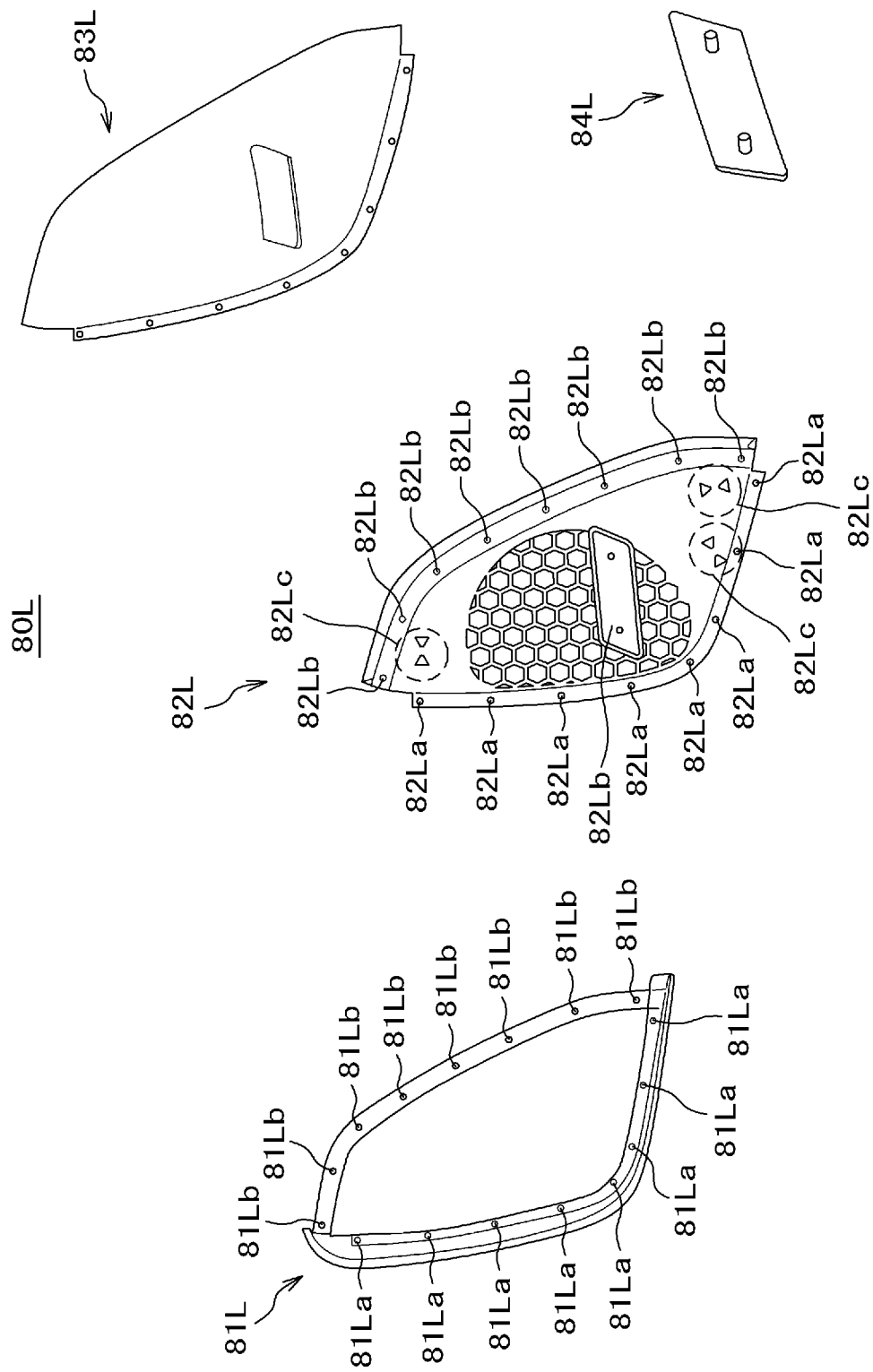
FIG. 11 is an exploded perspective view illustrating the speaker grill in FIG. 10.

A description will be given to a structure of each speaker grill unit with reference to FIGS. 10 and 11. FIG. 10 is a perspective view illustrating a speaker grill unit in FIG. 3. FIG. 11 is an exploded perspective view of the left speaker grill unit in FIG. 10. Hereafter, a description will be given to the left speaker grill unit 80; however, the right speaker grill unit is structurally in plane symmetry with the left speaker grill unit and a description of the right speaker grill unit is identical with that of the left speaker grill unit.

The speaker grill unit 80L is formed by providing a speaker grill trim 81L with a speaker grill 82L, grill scrim 83L, and a logo plate 84L.

The speaker grill trim 81L is made of synthetic resin such as polypropylene and includes: eight protrusions 81La for installing the speaker grill 82L and the grill scrim 83L; and eight holes 81Lb for installing the speaker grill 82L. The speaker grill 82L is made of synthetic resin such as polypropylene and includes a honeycomb-like opening adapted to the opening of the cover portion 55L. The speaker grill 82L includes: eight holes 82La into which the protrusions 81La of the speaker grill trim 81L are inserted; eight protrusions (not shown) positioned behind eight locations 82Lb and inserted into the holes 81Lb in the speaker grill trim 81L; three protrusions (not shown) positioned behind three locations 82Lc and inserted and fitted into the holes 55Le in the cover portion 55L; a logo plate attaching portion 82Ld for attaching a logo plate 84L. The grill scrim 83L is a sheet of black, coarse, and thin cloth (fabric). A portion of the grill scrim 83L where the logo plate 8L is to be positioned is removed.

The protrusions 81La of the speaker grill trim 81L are inserted into the holes 82La in the speaker grill 82L from the back side and the protrusions on the back side of the speaker grill 82L are inserted into the holes 81Lb in the speaker grill trim 81L. Thus, the speaker grill 82L is attached from outside (front side of) the speaker grill trim 81L. In addition, the protrusions 81La of the speaker grill trim 81L are inserted into the holes 83La in the grill scrim 83L from the back side and secured by ultrasonic welding or the like. The grill scrim 83L is installed on the front side of the speaker grill 82L and the logo plate 84L is attached to the speaker grill 82L through the opening in the grill scrim 83L. Thus, the speaker grill unit 80L is assembled.

Figure 12:
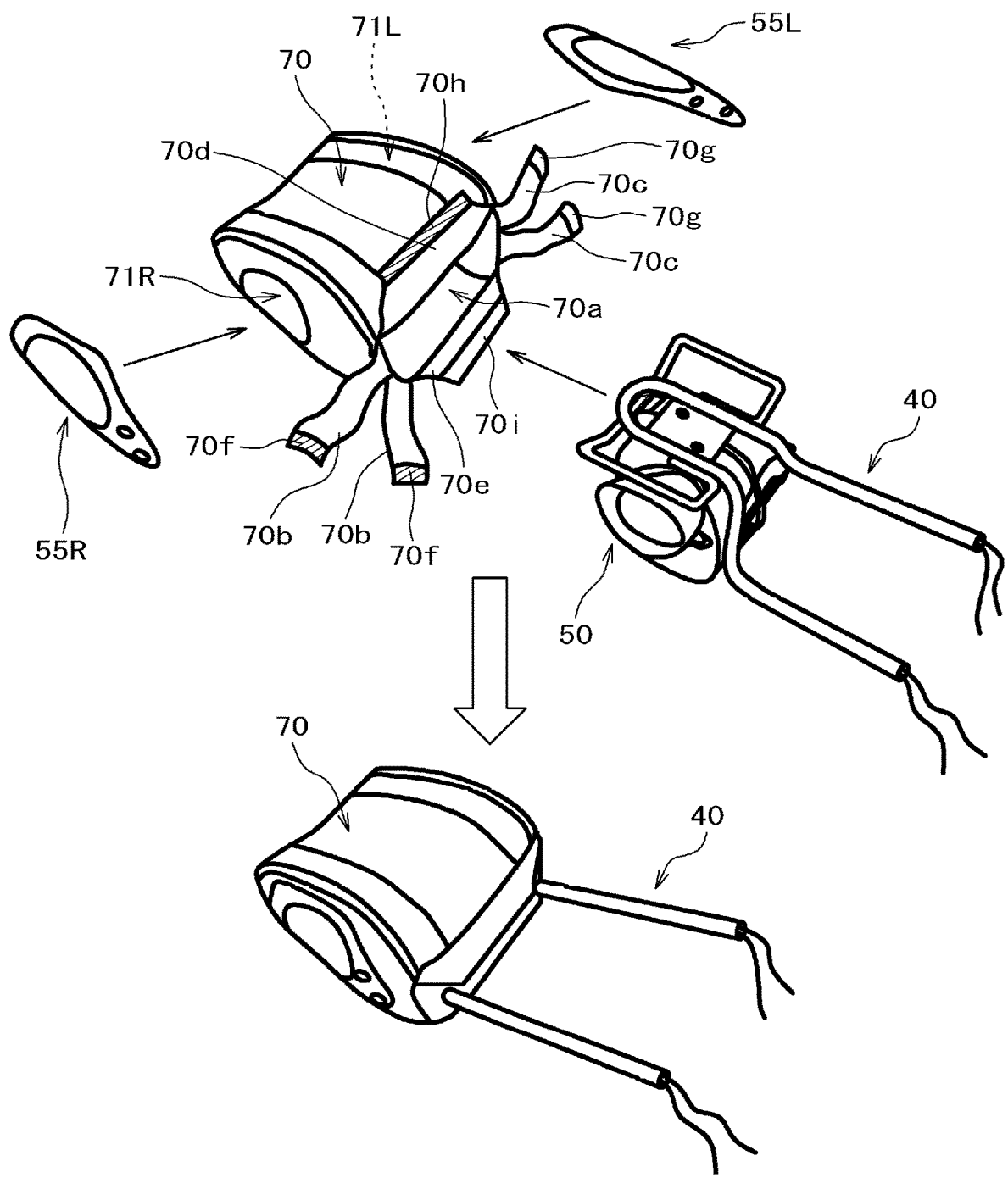
FIG. 12 is a perspective view illustrating a manufacturing method for the headrest in FIG. 3.

A description will be given to the skin material with reference to FIG. 12. FIG. 12 is a perspective view illustrating a manufacturing method for the headrest in FIG. 3. The skin material 70 is formed of cloth, synthetic leather, genuine leather, or the like and has openings 71R, 71L in positions where the cover portions 55R, 55L are to be attached and is sewed into a pouch shape. The skin material 70 has at its lower end an opening 70a for inserting the speaker unit 50 and the like; and the opening is closed by folding the skin material forward and rearward and leftward and rightward, except holes through which the longitudinal frame portions 41a, 41b of the headrest stay 41 are to be passed. A more specific description will be given. The skin material 70 has six extended portions which close the opening portion 70a of the skin material after the speaker unit 50 and the like are inserted. The six extended portions are bifurcated right extended portions 70b, bifurcated left extended portions 70c, a front extended portion 70d, and a rear extended portion 70e; and a hook and loop fastener 70f, 70g, 70h, 70i is attached to the vicinities of the opening 70a-side end and the opposite-side end of each extended portion. The hook and loop fasteners 70g are positioned on the back side of the left extended portions 70c in the drawing and the hook and loop fastener 70i is positioned on the back side of the rear extended portion 70e in the drawings. The left extended portions 70b and the right extended portions 70c can be fastened together by these hook and loop fasteners 70f, 70g and can also be fastened together with the front extended portion 70d and the rear extended portion by the hook and loop fasteners 70h, 70i.

Figure 13:
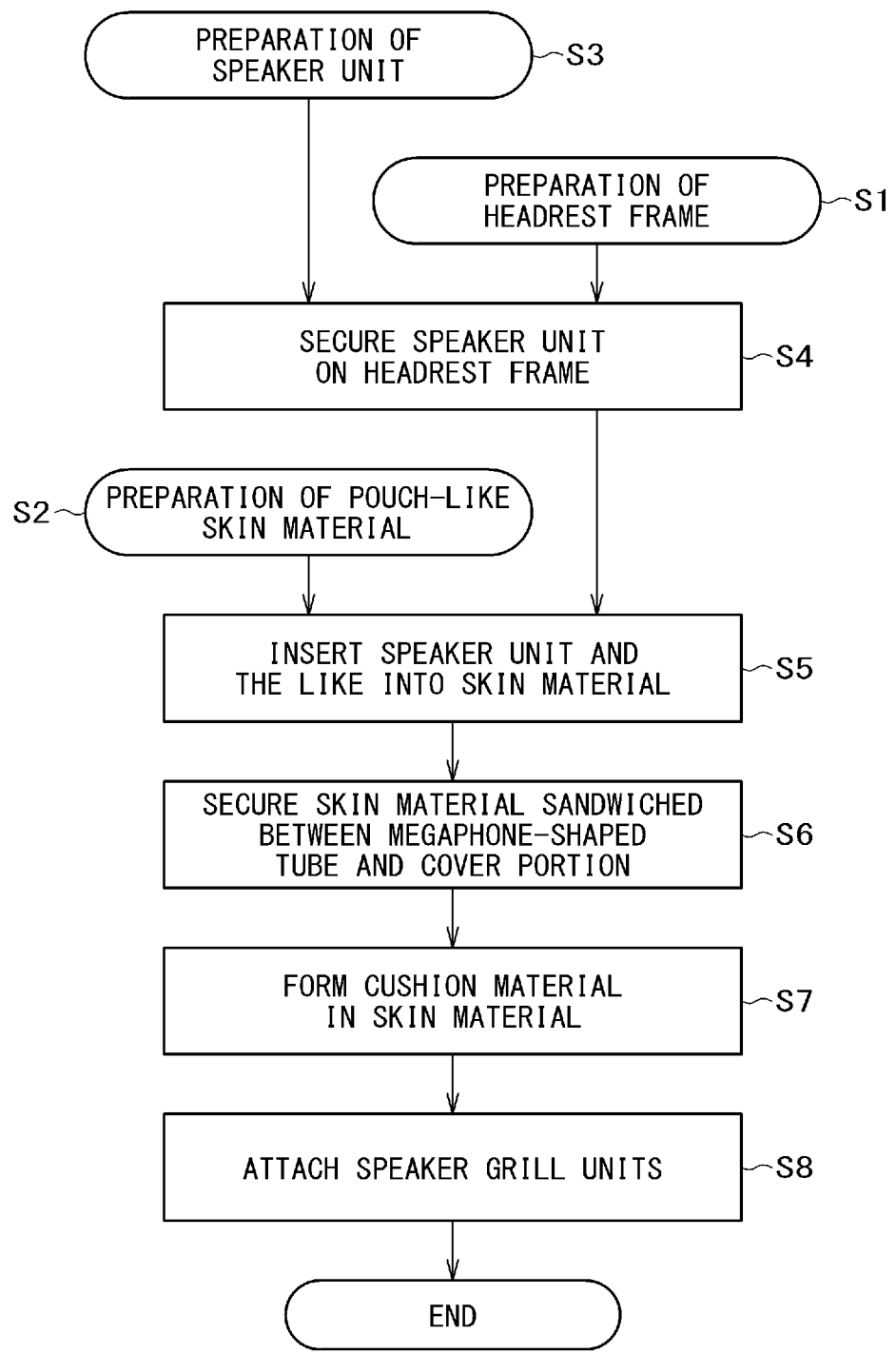
FIG. 13 is a flowchart illustrating a manufacturing method for the headrest in FIG. 3.

A description will be given to a manufacturing method for the headrest 4 with reference to FIGS. 3 to 13. FIG. 13 is a flowchart illustrating a manufacturing method for the headrest in FIG. 3.

The headrest support wire 42, the headrest bracket 43, and the headrest bracket 44 are bonded to the headrest stay 41 by welding or the like to prepare the headrest frame 40 (Step S1).

The skin material 70 sewed into a pouch shape, having the openings 71R, 71L in positions where the cover portions 55R, 55L are to be attached is prepared (Step S2).

Preparation of the speaker unit 50 (Step S3) will be described below:

The member 51M is inserted into between and bonded to the speaker box 51R and the speaker box 51L to assemble the speaker box 51.

The speaker wiring 53L is installed on the speaker 52L and the speaker 52L is inserted into the opening portion 51Le in the speaker box 51L and the speaker wiring 53L is taken out.

A hole in the mounting portion 52La of the speaker 52L and a hole in the mounting portion 54Lc of the megaphone-shaped tube 54L are aligned with the screw 51La of the speaker box 51L and the screw 56La is inserted into the holes to fasten these portions and the speaker box together. A hole in the mounting portion 52Lb of the speaker 52L and a hole in the mounting portion 54Ld of the megaphone-shaped tube 54L are aligned with the screw hole 51Lb in the speaker box 51L and the screw 56Lb is inserted into the holes to fasten these portions and the speaker box together. Consequently, the megaphone-shaped tube 54L and the speaker 52L are jointly fastened to the speaker box 51L. At this time, the flange portion 52Lc of the speaker 52L is sandwiched and secured between the speaker box 51L and the base portion of the megaphone-shaped tube 54L. The speaker 52R and the megaphone-shaped tube 54R are also similarly installed.

A step (Step S4) of securing the speaker unit 50 prepared at Step S3 on the headrest frame prepared at Step S1 will be described below:

The hole 43a in the bracket 43 of the headrest frame 41 and the screw hole 51Lc in the speaker box 51L are aligned with each other and the screw 45a is inserted into these holes to fasten the bracket and the speaker box together; and the hole 43b in the bracket 43 of the headrest frame 41 and the screw hole 51Rc in the speaker box 51R are aligned with each other and the screw 45b is inserted into these holes to fasten the bracket and the speaker box together. Further, the hole 44a in the bracket 44 of the headrest frame 41 and the screw hole 51Ld in the speaker box 51L are aligned with each other and the screw 46a is inserted into these holes to fasten the bracket and the speaker box together; and the hole 44b in the bracket 44 of the headrest frame 41 and the screw hole 51Rd in the speaker box 51R are aligned with each other and the screw 46b is inserted into these holes to fasten the bracket and the speaker box together. In addition, the protruded portion 54Le of the megaphone-shaped tube 54L is engaged with the outer longitudinal wire portion 42c of the headrest support wire 42; and the protruded portion 54Re of the megaphone-shaped tube 54R is engaged with the outer longitudinal wire portion 42d of the headrest support wire 42. Thus, the speaker unit 50 is secured and installed on the headrest frame 41.

The headrest frame 40 with the speaker unit 50 attached to the headrest frame is inserted from the opening 70a provided on the bottom face side of the skin material 70 sewed into a pouch shape (Step S5). With the headrest frame 40 inserted at this time, the longitudinal frame portions 41a, 41b of the headrest stay 41 are protruded from the skin material 70.

To close the hole formed by the opening 70a, the opening 70a is covered with the right extended portions 70b and the left extended portions and both the extended portions are secured together with the hook and loop fasteners 70f, 70g. The longitudinal frame portions 41a, 41b are respectively positioned between the two right extended portions 70b, 70b and left extended portions 70c, 70c. Further, the opening 70a is covered with the front extended portion 70d and the rear extended portion 70e and both the extended portions are secured together with the hook and loop fasteners 70h, 70i. The front extended portion 70d and the rear extended portion 70e are positioned between the longitudinal frame portions 41a, 41b. As the result of the opening 70a being closed with the six extended portions, the skin material 70 is brought into a complete pouch shape.

The entire opening 71L-side end portion of the skin material 70 is sandwiched between the flange portion 54Lb of the megaphone-shaped tube 54L and the flange portion 55Lb of the cover portion 55L. The protrusion 54Le of the flange portion 54Lc of the megaphone-shaped tube 54L is inserted into the hole 55Ld in the flange portion 55Lb of the cover portion 55L to secure the skin material 70 (Step S6).

As mentioned above, the speaker 52L and the megaphone-shaped tube 54L are jointly fastened to the speaker box 51L and brought into tight contact with each other; and similarly, the speaker 52R and the megaphone-shaped tube 54R are jointly fastened to the speaker box 51R and brought into tight contact with each other. The skin material 70 is sandwiched between the megaphone-shaped tube 54L and the cover portion 55L and brought into tight contact with the megaphone-shaped tube 54L and the cover portion 55L. Similarly, the skin material 70 is sandwiched between the megaphone-shaped tube 54R and the cover portion 55R and brought into tight contact with the megaphone-shaped tube 54R and the cover portion 55R. Thus, the pouch-shaped skin material having the same sealability as headrests without built-in speakers is formed.

Hereafter, a description will be given to skin integral foam molding (Step S7).

The pouch-shaped skin material 70 including the headrest frame 40 (except part of the headrest stay 41) and the speaker unit 50 (speakers 52R, 52L, speaker box 50, megaphone-shaped tubes 54R, 54L) is set in a mold (not shown). For example, the bottom face side (the longitudinal frame portions 41a, 41b of the headrest stay 41 protruded from the skin material 70) of the skin material 70 is set upward. An injection nozzle (not shown) is inserted into a hole (not shown) formed in the front extended portion 70d and the rear extended portion 70e of the skin material 70 from above. A foaming material such as a urethane material is injected from an injecting machine (not shown) and foamed to form the cushion material 60. That is, a headrest form is formed by skin integral foam molding.

Thereafter, the three protrusions on the back side of the speaker grill unit 80L are inserted and fit into the three holes 55Le in the cover portion 55L to install the speaker grill unit 80L (Step S8). The speaker grill unit 80R is similarly installed on the cover portion 55R to manufacture the headrest 4.

As illustrated in FIG. 3, the headrest 4 is covered with the skin material 70 on the front side and the rear side and is covered with the skin material 70 and the speaker grill units 80R, 80L on the left side and the right side. That is, the speaker grill units 80R, 80L form part of the side portions of the headrest 4. The headrest 4 is recessed at the front part and projected at the rear part and the side parts as sectionally viewed. The back of the head of a seating person is abutted against the skin material 70 in the recessed position at the front part of the headrest 4. Some parts of the cushion material 60 and the skin material 70 are positioned ahead of the megaphone-shaped tubes 54R, 54L.

The speakers 52R, 52L are installed such that the speakers are respectively oriented outward of the center of the headrest 4, rather than frontward. In this embodiment, the speakers 52R, 52L are disposed such that the speakers are respectively oriented outward from the frontward direction by approximately 45 degrees. The megaphone-shaped tubes 54R, 54L are disposed such that the tubes are oriented more outward than the speakers 52R, 52L are. The megaphone-shaped tubes 54R, 54L are respectively longer on the front side than on the rear side. Some parts of the speakers 52R, 52L are protruded more outward than the speaker boxes 51R, 51L are. The cushion material 60 is positioned ahead of a part of the speaker box 51 positioned most frontward and further the skin material 70 is positioned there. The distance between the front side of the speaker box 51 and the skin material 70 on the front side of the headrest 4 is larger than the distance between the rear side of the speaker box 51 and the skin material 70 on the rear side of the headrest 4. In other words, the cushion material 70 on the front side of the speaker box 51 is thicker than the cushion material 70 on the rear side.

Skin integral form moldings are basically made by injecting a urethane material into a pouch-shaped skin material and foaming the material; therefore, this molding technique requires sealability (hermeticity). In this embodiment, the skin material is sandwiched between and brought into tight contact with the megaphone-shaped tubular portions for preventing a sound from the speakers from being blocked off and the cover portions. Since the speakers and the megaphone-shaped tubes are jointly fastened to the speaker box and the megaphone-shaped tubes are thus secured on the speaker box, the speakers are tightly fixed in the speaker box. As a result, a gap is not produced between the speaker box and the speakers and the hermeticity of the speaker box (enclosure) can be maintained during integral foam molding. As mentioned above, the megaphone-shaped tubes contribute to both the effects of hermeticity of the skin to the exterior and hermeticity of the speaker box to the interior.

As a result, the pouch-shaped skin material is formed and sealability can be ensured and skin integral foam molding can be implemented. Necessity for installation of the skin material at any different step is obviated and thus a simple structure can be obtained in terms of appearance.

Up to this point, the invention made by the present inventors has been specifically described based on an embodiment. However, the present invention is not limited to the above-mentioned embodiment and can be variously modified, needless to add.

Some examples will be taken. In the description of the above embodiment, a case where three round holes are formed in each cover portion for installing a speaker grill is taken as an example. The present invention is not limited to this and two rectangular holes may be provided instead. In this case, two protrusions to be fit into the rectangular holes are provided on the back side of each speaker grill.

In the above description of this embodiment, a case where the flange portion 54Lb of the megaphone-shaped tube 54L has the protruded portion 54Lg and the flange portion 55Lb of the cover portion 55L has the hole 55Ld is taken as an example. The present invention is not limited to this. The protruded portion 54Lg and the hole 55Ld constituting engaging portions may be omitted; and a hole may be provided instead of the protruded portion 54Lg and a protruded portion may be provided instead of the hole 55Ld.

In this embodiment, the speaker unit 50 is disposed behind the headrest frame 40. When the entire headrest is differently shaped, the speaker unit 50 may be disposed ahead of the headrest frame 40.

The invention claimed is:

1. A headrest comprising:
   (a) a headrest frame;
   (b) a speaker unit supported by the headrest frame and including a speaker box, a speaker attached to the speaker box, and a megaphone-shaped tube attached to the speaker box;
   (c) a cushion material formed by a foam injection process;
   (d) a skin material having an opening, the skin material being sewed into a pouch shape, covering the headrest frame, the speaker unit, and the cushion material, wherein the opening in the skin material is provided adjacent an opening at an end of the megaphone-shaped tube; and
   (e) a ring-shaped member securing portions of the skin material surrounding the opening in the skin material by sandwiching the portions of the skin material surrounding the opening in the skin material between the ring-shaped member and the megaphone-shaped tube, thereby forming a seal for the prevention of leakage of the cushion material during the foam injection process.

2. The headrest according to claim 1,
   wherein the megaphone-shaped tube has a flange portion at an end portion on the side opposite the speaker,
   wherein the ring-shaped member has a tubular portion inserted into and abutted against the megaphone-shaped tube and a flange portion abutted against the flange portion of the megaphone-shaped tube, and
   wherein the portions of the skin material surrounding the opening are sandwiched and secured between the flange portion of the megaphone-shaped tube and the flange portion of the ring-shaped member.

3. The headrest according to claim 2,
   wherein the speaker and the megaphone-shaped tube are jointly fastened to the speaker box.

4. The headrest according to claim 3,
   wherein the opening at an end of the megaphone-shaped tube is larger than an opening in the speaker box.

5. The headrest according to claim 4, further comprising:
   a speaker grill attached to the ring-shaped member and covering an opening portion of the speaker unit.

6. The headrest according to claim 2,
   wherein the flange portion of the megaphone-shaped tube has an engaging portion, and
   wherein the flange portion of the ring-shaped member has an engaging portion engaged with the engaging portion of the flange portion of the megaphone-shaped tube.

7. The headrest according to claim 1,
   wherein the headrest frame includes: a headrest stay inserted into a mounting portion of a seat back, a first bracket securing a front face of the speaker box, a second bracket securing a bottom face of the speaker box, and an auxiliary wire anchoring the speaker box, and
   wherein the headrest stay includes: a longitudinal frame portion securing the first bracket and the auxiliary wire, and a horizontal frame portion securing the second bracket.

8. The headrest according to claim 1,
   wherein the ring-shaped member comprises an attachment portion for attaching a speaker grill to the ring-shaped member.

9. The headrest according to claim 1,
   wherein the headrest is manufactured by a method comprising the steps of:
   preparing the headrest frame, preparing the skin material into a pouch shape, preparing the speaker unit including the speaker box, the speaker attached to the speaker box, and the megaphone-shaped tube attached to the speaker box;
   securing the speaker unit on the headrest frame;
   inserting the speaker unit secured on the headrest frame into the skin material pouch;
   sandwiching and securing the portions of the skin material surrounding the opening in the skin material between the megaphone-shaped tube and ring-shaped member; and
   injecting a foaming material into the skin material pouch to form the cushion material.

10. A manufacturing method for the headrest according to claim 1, comprising the steps of:
    (a) preparing the headrest frame, preparing the skin material into a pouch shape, preparing the speaker unit including the speaker box, the speaker attached to the speaker box, and the megaphone-shaped tube attached to the speaker box;
    (b) securing the speaker unit on the headrest frame;
    (c) inserting the speaker unit secured on the headrest frame into the skin material pouch;
    (d) sandwiching and securing the portions of the skin material surrounding the opening in the skin material between the megaphone-shaped tube and ring-shaped member; and
    (e) injecting a foaming material into the skin material pouch to form the cushion material.

11. The manufacturing method according to claim 10,
    wherein the step (a) includes a step of jointly fastening the speaker and the megaphone-shaped tube to the speaker box.

12. The manufacturing method for a headrest according to claim 11, further comprising the step of:
    (f) after the step (e), attaching a speaker grill to the ring-shaped member.

13. A vehicular seat comprising:
    (a) the headrest according to claim 1;
    (b) a seat back having a headrest holder supporting the headrest; and
    (c) a seat cushion coupled to the seat back.

14. The vehicular seat according to claim 13,
    wherein the megaphone-shaped tube has a flange portion at an end portion on the side opposite the speaker, wherein the ring-shaped member has a tubular portion inserted into and abutted against the megaphone-shaped tube and a flange portion abutted against the flange portion of the megaphone-shaped tube, and wherein portions of the skin material surrounding the opening are sandwiched and secured between the flange portion of the megaphone-shaped tube and the flange portion of the ring-shaped member.

15. The vehicular seat according to claim 14,
wherein the speaker and the megaphone-shaped tube are jointly fastened to the speaker box.

16. The vehicular seat according to claim 15,
wherein the opening at an end of the megaphone-shaped tube is larger than an opening in the speaker box.

17. The vehicular seat according to claim 16, further comprising:
a speaker grill attached to the ring-shaped member and covering an opening portion of the speaker unit.

18. The vehicular seat according to claim 13,
wherein the headrest frame includes: a headrest stay inserted into the headrest holder, a first bracket securing a front face of the speaker box, a second bracket securing a bottom face of the speaker box, and an auxiliary wire anchoring the speaker box, and wherein the headrest stay includes: a longitudinal frame portion securing the first bracket and the auxiliary wire, and a horizontal frame portion securing the second bracket.

19. The vehicular seat according to claim 13,
wherein the flange portion of the megaphone-shaped tube has an engaging portion, and wherein the flange portion of the ring-shaped member has an engaging portion engaged with the engaging portion of the flange portion of the megaphone-shaped tube.

* * * * *